United States Patent [19]
Osborne

[11] Patent Number: 4,934,615
[45] Date of Patent: Jun. 19, 1990

[54] BALE SHREDDING APPARATUS

[75] Inventor: Geoffrey Osborne, St. Agnes, England

[73] Assignee: Teagle Machinery Limited, Cornwall, England

[21] Appl. No.: 241,918

[22] Filed: Sep. 7, 1988

[30] Foreign Application Priority Data

Sep. 8, 1987 [GB] United Kingdom ............... 8721069
Sep. 23, 1987 [GB] United Kingdom ............... 8722435
Feb. 9, 1988 [GB] United Kingdom ............... 8802913

[51] Int. Cl.⁵ .................................. B02C 13/286
[52] U.S. Cl. .............................. 241/101 A; 241/186.4
[58] Field of Search ............ 241/101 A, 189 R, 186.4, 241/188 R, 186 R, 186.2, 186.3, 101.7, 224, 285 R, 285 A, 285 B

[56] References Cited

U.S. PATENT DOCUMENTS

4,448,361  5/1984  Marcy ..................... 241/186.4 X
4,485,976  12/1984  White ..................... 241/186.4 X
4,790,489  12/1988  Paul ...................... 241/101 A

*Primary Examiner*—Timothy V. Eley
*Attorney, Agent, or Firm*—Gifford, Groh, Sprinkle, Patmore and Anderson

[57] ABSTRACT

Bale shredding apparatus comprises a rotatable drum of cylindrical form open at one end for receiving a bale to be shredded and closed at the opposite end by a stationary end wall having an opening through which projects a rotary cutter having axially projecting radial blades which act to tear material from a bale placed in the drum and deliver it to shredder teeth of the rotor from which the shredded material is discharged via an outlet chute. The drum is mounted on a frame comprising a drum mounting frame and a connector frame which are pivotally joined together such that the inclination of the axis of the drum can be varied from a horizontal position to a maximum working inclination less than 90°.

13 Claims, 5 Drawing Sheets

BALE SHREDDING APPARATUS

BACKGROUND OF THE INVENTION

Traditionally, straw and other bulk agricultural products have been embaled in rectangular parallelepiped bales of a size which can be manually handled. More recently, however, so-called "round" bales have been used, with increasing frequency, to store bulk agricultural products such as hay, silage and straw. Round bales are formed by gathering the bulk product in a generally cylindrical container to form a large cylindrical body which may weigh between 150 and 200 kilograms (for less dense materials such as straw) and 1000 kilograms (in the case of more dense materials such as silage). Such bales cannot readily be manipulated by hand although certain limited movements, such as tipping or rolling of the bales can be effected.

Prior art bale shredding apparatus comprises a cylindrical upwardly open drum rotatable about a vertical axis and having a cutter in or forming the lower end of the drum. This requires the use of separate equipment to raise a bale to be introduced into the drum through the open upper end.

OBJECTS OF THE INVENTION

A primary objection of the present invention is to provide bale shredding apparatus which can be loaded easily with a round bale standing on the ground or with a number of rectangular bales.

Another object of the present invention is to provide bale shredding apparatus which acts efficiently to shred and distribute agricultural products from a bale, with the material being chopped into shorter lengths than known such apparatus.

SUMMARY OF THE INVENTION

According to one aspect the present invention provides bale shredding apparatus of the type having a rotatable drum for receiving a bale to be shredded, a cutter mounted so that the blades thereof project into the interior of the drum to engage a bale therein, and means for discharging from the drum material removed from the bale by the cutter, characterised in that the drum is mounted on a support such that its axis of rotation lies inclined at an angle to the horizontal less than 90° at least in the working position thereof. The advantages of this arrangement are that not only can the bale be loaded more easily than if the drum axis were vertical as in, for example, prior European patent application No. 244,977, but also the inclination of the drum can be varied so that the feed rate of the material to the cutter can be controlled to suit the material and the form of the cutter, where in prior art shredders it has been necessary to include means for limiting the approach of the bale in order not to clog the cutter blades. It is preferred that the maximum drum axis angle to the horizontal in less than 80° and it has been found that an inclination of less than 60° to the horizontal whilst the drum is turning and the cutter is in operation provides particularly good operating conditions.

Preferably, the support on which the drum is mounted is a frame so adapted that the inclination of the axis of the drum is adjustable, between a horizontal position to allow manual loading of a bale to be achieved by tipping a bale into the substantially horizontal drum, and a maximum inclination less than 90°. In this inclined position, when rotation of the drum is commenced, the bale (which may not be fully introduced into the drum) is caused to move axially of the drum by the action of gravity assisted possibly by inclined guide vanes lying at an acute angle to a diametral plane parallel to the axis of the drum. Such guide vanes project inwardly of the drum surface by a few centimeters, which is sufficient to grip the material of the bale to cause it to rotate and at the same time apply an axial force which, together with the component of force axially of the bale exerted by gravitational attraction, causes the bale to move axially along the drum until it contacts an end wall thereof.

The cutter may include a rotor comprising a plurality of cranked generally radially outwardly extending blades projecting axially through an opening in a base wall of the drum, which base wall does not rotate with the cylindrical wall of the drum.

Although primarily intended for use with round bales, it will be appreciated that the machine of the present invention will also operate effectively if a number of conventional rectangular bales are introduced into it. In operation a bale in the drum is carried around by the rotation of the drum with respect to the cutter so that the cutter can act on the face of the bale facing the end of the drum, working on a portion of this end face at a time as this is brought past the cutter by the rotation of the drum.

Preferably, the cutter is carried on a circular base spaced axially from the end wall of the drum such as to form an axial space between the drum end wall and the cutter base. This axial space is preferably filled with shredder teeth in two rows, one row being mounted around the perimeter of an aperture in the end wall of the drum through which the cutter projects, and the other row being mounted on the perimeter of the circular base of the cutter. Preferably the shredder teeth mounted on the perimeter of the circular base of the cutter are located radially outwardly of the teeth mounted on the rim of the opening in the end wall of the drum: each set of teeth may extend substantially axially of the drum.

Preferably the rotary drum is provided with interior guides projecting radially inwardly and extending axially along a substantially helical path inclined at an acute angle to a generatrix of the drum. Preferably the direction of the pitch is such as to urge a bale into contact with the cutters upon rotation of the drum, although it is possible that embodiments may be made in which the load on the cutters may be reduced by the action of these guides by forming them with an opposite pitch from that which will cause axial thrust towards the cutter.

The apparatus of the invention is provided with at least one and preferably two discharge chutes, one on each side of the apparatus, extending generally transversely with respect to the axis of the drum.

The form of the cutter blades affects the efficiency with which the material is separated from the bale and transferred to the shredder teeth for shredding and delivery through the discharge chutes. In a preferred embodiment of the invention the cutter is provided with two pairs of blades each pair extending generally radially outwardly away from one another but raked or swept back in relation to the direction of rotation, and each blade having a radially inner portion inclined at an acute angle to the plane of rotation of the cutter base and a radially outer portion. One pair of two opposite blades has a radially outer portion separated from the radially inner portion by a single fold line which, however, is not orthogonal to the length of the blade, but rather inclined at an acute angle to a line extending orthogonally of the length of the blade so that the radially outer portion has a chord lying at an angle to the plane of the base of the cutter, the inclination being such that the leading edge of the blade is spaced further from the base of the cutter than the trailing edge thereof.

The other pair of two opposite blades, on the other hand, have a radially outer portion separated into two parts by a second fold line to define an intermediate part of the radially outer portion and a tip part, the intermediate part having a chord lying at an acute angle to the cutter base, with a leading edge thereof spaced further from the base than a trailing edge, and the leading and trailing edges being generally parallel to the cutter base, whilst the tip part is inclined towards the cutter base such that the radially outermost end of the tip part is closer to the cutter base than the fold line separating the tip part from the intermediate part of the radially outer portion of the cutter blades. These latter cutter blades will, hereinafter, be referred to as blades of the three-part type, to distinguish them from blades having a single fold line which will be referred to as blades of the two-part type. The rake or swept back configuration of the blades aids self-cleaning thereof in use and helps to avoid clogging.

The function of the three-part blades is partly to separate the material from the bale and partly (the tip part of the radially outer portion) to encourage axial displacement of such separated material and radial displacement towards the shredder teeth. Such displacement is also, of course, encouraged by the centrifugal force exerted by the rotating cutter base, which latter may be plain or formed with surface formations encouraging such radial displacement of the material removed from the bale.

In the preferred embodiment of the invention the cutter is provided with means for connecting directly to the power take-off shaft of a tractor, whilst the drum is provided with a separate motor, for example a pneumatic or hydraulic motor, to be driven from the tractor's hydraulic system or (in the case of a pneumatic motor) via a compressor which in turn may be directly mechanically driven or driven via the tractor's hydraulic system, or an electric motor supplied from the tractor's electrical circuit. Embodiments of the invention are envisaged, however, in which the drive for the drum is taken from the power take-off shaft itself via suitable reduction gearing.

The rotary cutter and the drum ma be driven in the same or in opposite directions of rotation, in which latter case the generally radially extending cutter blades are travelling in an opposite linear direction from the material of the bale at that part of the arc of contact between the cutter and the bale which is closest to the cylindrical surface of the bale.

The present invention also comprehends bale shredding apparatus having a cylindrical drum mounted for rotation about an inclined axis, rotary cutter blades at one end of the drum and radially inwardly projecting helically extending guide vanes on the inside surface of the drum acting to urge material in the drum axially towards the cutter blades as the drum rotates.

Preferably the support frame comprises a drum mounting frame carrying the drum and an attachment frame to which the mounting frame is pivotally connected and which incorporates means for attachment to a tractor three point linkage. The pivotal connection between the attachment frame and the mounting frame may incorporate mechanical or hydraulic means for varying the relative inclination of the mounting frame with respect to the attachment frame whereby to effect changes in inclination in the drum. Furthermore, by utilising a 3-point linkage configuration with a relatively high upper connection point, it is possible to increase the inclination of the drum as the linkage is raised.

In a preferred embodiment of the invention the adjustor is provided in the form of a releasable connector pivotally mounted to the mounting frame and engageable in the attachment frame at different positions. Then, by providing a foot at the rear of the machine it is possible to control the inclination of the drum whilst it is resting on the ground by raising or lowering the lift arms of the tractor 3-point linkage with the top link disconnected s that the machine as a whole is not raised. Alternatively an hydraulically extendable top link may be used for the purpose of varying the inclination of the drum.

The apparatus of the present invention, has outlets for the discharge of the product, of the operation being performed within the apparatus. Close to the vicinity of such discharge chute there are rotating or moving parts, especially blades or cutters, and a major risk with such machines is that in the event of a blockage of the discharge chute manual attempts to clear the chute can lead to mutilation of the operator by the working parts of the machinery which can be reached fairly readily from the exit end of the discharge chute. In order to mitigate this problem regulations are in force determining the minimum length of discharge chutes from many types of machinery, but this can constitute a disadvantage, particularly by increasing the dimensions of the machine which for practical purposes it is desired to reduce. A reduction in the length of the discharge chute would be possible if a protective guard or grill could be placed between the exit of the discharge chute and the moving parts of the machinery, but the presence of such a grill would present an obstacle to the free movement of the material being discharged and consequently increase the risk of blockage.

Embodiments of the present invention may be provided with a protective guard for a discharge chute, comprising one or a plurality of inclined, substantially inflexible elongate barrier elements attached at one end to one side of the chute and having a free end spaced from a side of the chute opposite that to which the barrier element or elements is or are attached, and in the vicinity of the exit from the discharge chute.

Other features and advantages of the present invention will become apparent from a study of the following description with reference to the accompanying drawings, provided purely by way of non-limitative example.

DESCRIPTION OF THE PREFERRED EMBODIMENTS

Referring now to the drawings, the bale shredding machine of the invention, generally indicated with the reference numeral 11, comprises a cylindrical drum 12 carried on a support frame generally indicated 10, which support frame is formed in two parts namely a drum mounting frame generally indicated 13 connected to an attachment frame generally indicated 14.

The cylindrical drum 12 comprises a cylindrical wall 15 having an open end 16 and closed at the opposite axial end by a stationary circular end wall 17 with respect to which the cylindrical wall 15 is rotatable.

Figure 1:
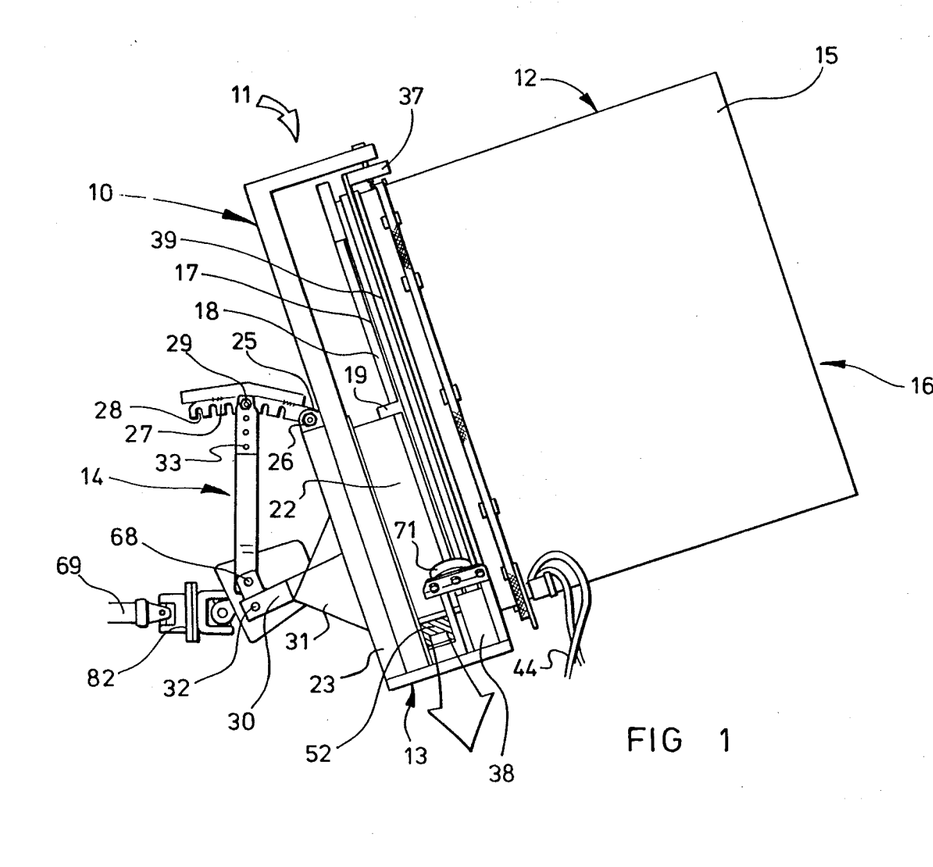
FIG. 1 is a schematic side view of a bale shredding machine formed as an embodiment of the invention.

The circular stationary end wall 17 is carried on a reinforcing framework comprising uprights 18, only one of which can be seen in FIG. 1, spanned by at least one transverse beam 19 and others which cannot be seen in the drawings which, together, form a planar reinforcing frame carrying the circular end wall 17.

The stationary end wall 17 has a circular opening 20 through which extends a bale cutter generally indicated 21 enclosed within a cutter housing 22 attached to the stationary end wall 17 around the opening 20. Two uprights 23 of the drum mounting frame 13 (only one of which can be seen in FIG. 1 and FIG. 2) are attached to the cutter housing 22 and joined at the top by a transverse beam 24 upwardly from which project a pair of lugs 25 through which passes a pin 26 forming a pivot for an adjustor arm 27 having a plurality of notches 28 which can be selectively engaged over a pin 29 of the attachment frame 14. Two arms 30 of the drum mounting frame 13 project forwardly from the uprights 23, reinforced by triangular plates 31, and are pivotally connected at their forward ends by pivots 68 to the attachment frame 14: the arms 30 carry respective outwardly projecting pins 32 for receiving the lift arms of a tractor three point linkage. The attachment frame 14 is provided near its upper end with a plurality of holes 33 for receiving a connector pin to attach the top link of a tractor three point linkage by means of which the bale shredder machine 11 may be carried. Raising and lowering of the tractor three point linkage thus causes raising and lowering of the attachment frame 14 and the drum mounting frame 13 carried thereby.

The uprights 23 are joined at their lower ends by a transverse beam member 35 at opposite ends of which are mounted respective rollers 38 (only one of which is visible in FIGS. 1 and 2) the axes of which lie parallel to the axis of the drum 12, which latter is provided with a circumferentially extending radially projecting flange 39 on one side of which the rollers 38 contact the cylindrical wall 15 of the cylindrical drum 12 so that this can turn about its longitudinal axis with respect to the support frame %3. The flange 39 is engaged on one side by an upper roller 37 turnable about a radial axis and carried on an upper part of the drum mounting frame 13, and on the other side by two lower rollers 71 also turning about radial axes and spaced equidistantly from a vertical median plane through the arm. The rollers 37 and 71 act to resist any tendency of the drum to tip and will be referred to hereinafter as the drum orientation control rollers, whilst the rollers 38 will be referred to as the drum load bearing rollers.

On the left hand side of the machine (as viewed facing forwardly) the transverse beam member 35 also carries a support 41 for an hydraulic motor 42 which drives a pulley 43 over which passes a belt 44 which also passes around the cylindrical drum 15, guided in a plurality of pairs of projecting ribs 45, 46 spaced around the circumference of the drum. In this way the cylindrical wall 15 of the drum can be driven to rotate about its axis, carried on the drum mounting frame 13 by the rollers 37, 38, whilst the circular end wall 17 of the drum remains stationary, supported by the framework parts 18, 19 of the support frame 10. The hydraulic motor 42 is supplied through flexible lines 44 from the tractor's hydraulic circuit.

Within the cutter housing 22 is located a rotary cutter 21 having a circular base 45 to which is secured a central boss 46 from which project four radial cutter blades in two diametrically opposed pairs 47, 48. Around the perimeter of the cutter disc 45 are attached a plurality of axially extending shredder teeth 49 which lie in a circle just outside a similar circular row of axially extending shredder teeth 50 carried around the periphery of the aperture 20 in the end wall 17 of the drum. The tips of the cutter disc shredder teeth 49 overlap by an adjustable amount with the tips of the stationary ring of teeth 50 around the aperture 20, with the cutter disc shredder teeth 49 being located radially outwardly of the stationary ring of shredder teeth 50. Spaced radially inwardly of the ring of shredder teeth 49 are four axially extending individual clearing teeth 51 the function of which is to Prevent any clogging of the shredder teeth 50 since they pass relatively infrequently, and exert a shearing action on the opposite side of the stationary shredder teeth 50 from that exerted by the cutter disc shredder teeth 49. After having passed the shredder teeth 49, 50 the shredded straw is delivered to discharge outlets 52, one on each side of the machine, but only one of which can be seen from FIGS. 1 and 2.

Figure 4:
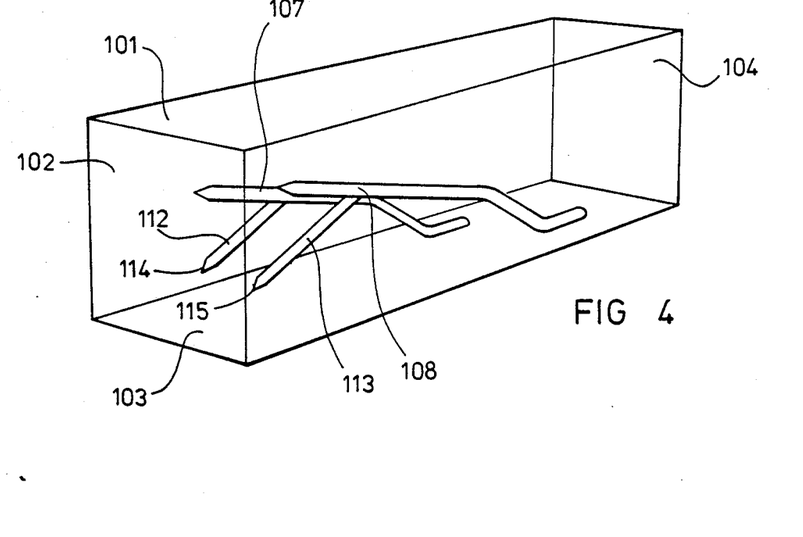
FIG. 4 is a perspective view of a discharge chute incorporating a protective guard formed in accordance with the principles of the present invention.
Figure 5:
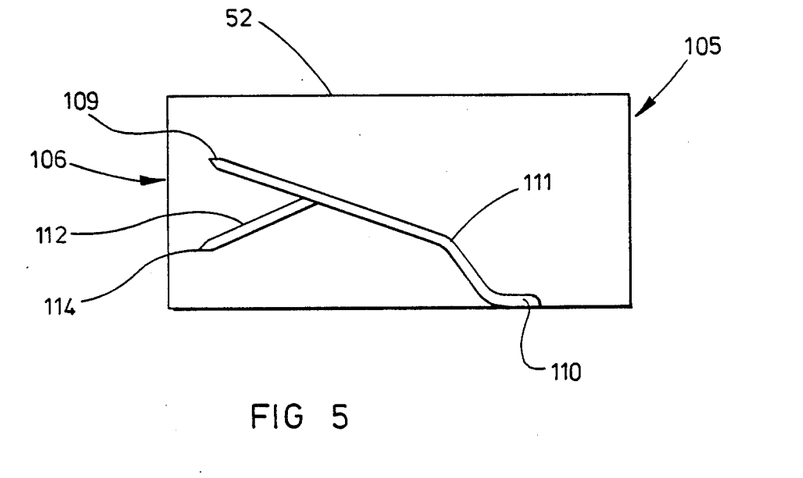
FIG. 5 is a sectional side view of the embodiment of FIG. 4.

The discharge chute 52 is illustrated in more detail in FIGS. 4 and 5. It is approximately square in cross-section and may typically be in the vicinity of 15 centimeters square by 300 centimeters long.

Conveniently the discharge chute may be made from flat panels or sheets, usually metal although other materials may be employed, each identical with one another and identified herein with the reference numerals 101, 102, 103 and 104. The inlet end of the discharge chute is identified with the reference numeral 105 and the exit end with the reference numeral 106. The discharge chute may be formed as a removable extension of the discharge outlet 41. Secure to the wall 103 of the discharge chute are two substantially inflexible elongate barrier members 107, 108 in the form of steel rods, sharpened at the free end 109 and secured by welding at the attached end 110. From the attached end 110 the elements extend for a short distance, in the region of 5 centimeters, at an angle of about 20° to the wall 103, and are there cranked at an elbow 111 from which they extend at an angle of about 10° to the wall 103 to the free end 109 which, as mentioned above, is pointed or tapered.

Attached to the main length of the elements 107, 108 are respective extension arms 112, 113 which have respective tips 114, 115 which, as can be seen from FIG. 1, form a substantially square pattern approximately 5 centimeters from one another and from the adjacent walls of the discharge chute. The pointed tips of these elements are not so sharp as to cause injury to a hand introduced into the discharge chute, but sufficiently sharp to constitute a warning that dangerous components are nearby. The spacing, in the region of 5 centimeters, is sufficiently small to make it difficult to introduce the hand past the tips without coming into contact with one or more of them.

The form of the cutter blades 47, 48 will now be described in more detail with reference to FIGS. 2 and 3. The central boss 46 of the cutter disc 45 has an inclined peripheral rim 53 at a shallow angle to the plane of the boss 46, and the four blades 47, 48 are secured at their radially inner ends by bolts or rivets 54 to this rim. Am can be seen in FIG. 3, the blades 47, 48 have a swept back or raked orientation lying at an angle alpha in the region of 60° to a diametral line intersecting the route of the blade as indicated by the line X—X of FIG. 3. The blades 47 differ from the blades 48 in that the latter have a single fold line 55 separating the blade 48 into a radially inner portion 56 and a radially outer portion 57 whereas the former have two fold lines, a radially inner or first fold line 58 separating the blade 47 into a radially inner portion 59 and a radially outer portion 60, and a second or radially outer fold line 61 separating the radially outer portion into an intermediate part 62 and a tip part 63. The radially inner portions 47 and 56 of all blades lie at approximately the same angle to the plane of the cutter disc 45, in the region of about 40° thereto. The inclination between the radially outer portion 57 of the single cranked blades 48 and the radially inner portion 56 thereof is in the region of about 47° such that the radially outer portions 57 are inclined at a shallow angle in the region of 7° with the radially outer end being closer to the cutter disc than the fold line 55. Further, it will be seen that the fold lines 55 do not extend orthogonally of the blades 48, but rather at an angle thereto so that the radially outer portions have a chord inclined to a plane parallel to that of the cutter disc 45 in such a way that a leading edge 63 of each radially outer portion 57 is spaced further from the cutter disc 45 than the trailing edge 64. The inclination between the radially inner portion 59 of the double cranked blades 47 and the intermediate part 62 of the radially outer portion 60 thereof is in the region of 56° so that, like the radially outer portion 57 of the blades 48 this intermediate part 62 is inclined at a shallow angle towards the cutter disc 45. The angle between the intermediate part 62 and the tip part 61 of the radially outer portion 60 of the blades 47 is in the region of 45° so that the tip part 63 is inclined sharply towards the cutter disc 45. Again, the fold line 58 is not orthogonally orientated with respect to the length of the blades 47 so that the intermediate part 62 has a chord inclined with an angle of attach such that a leading edge 65 is spaced further from the cutter disc 45 than a trailing edge 66.

Rotation of the cutter blades 47, 48 thus slices sections of the bale from the end face, and the angle of attack of the radially outer portions of the blades urges this axially towards the cutter disc 45 whilst the tip portions 63 of the blades 47 also act to encourage the cut straw to move radially outwardly into contact with the shredder teeth 49, 50, which action is also encouraged by the centrifugal forces exerted by contact of the straw With the cutter disc 45.

Figure 3:
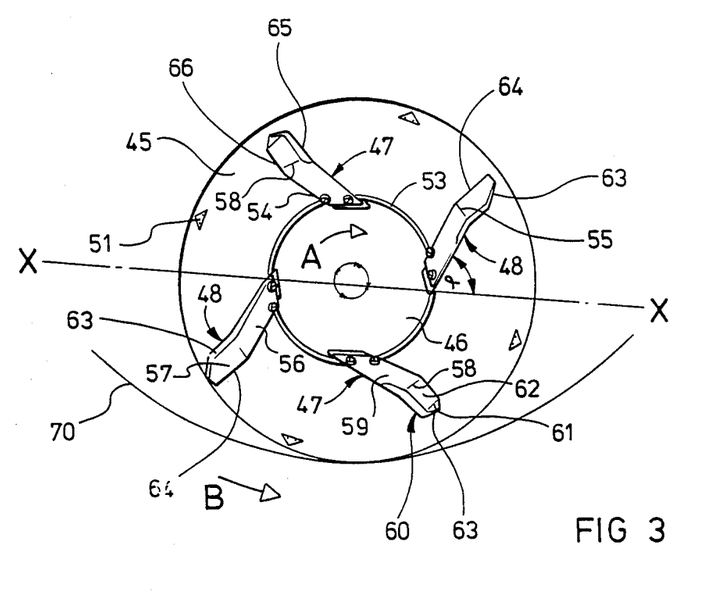
FIG. 3 is a schematic end view of the cutter blades of the bale shredding machine illustrated in FIGS. 1 and 2.

The cutter disc rotates in the direction of the arrow A of FIG. 3 whilst the cutter drum, only partly and schematically indicated in FIG. 3 by the arcuate line 70, turns in the direction of the arrow B. This movement maximises the relative motion of the cutter blades and the straw or other material being separated from the bale at the radially outer part of the drum (the lower quadrant of the cutter disc as viewed in FIG. 3) where, of course, the maximum amount of straw needs to be separated. It also serves to force the bale against the helix angle of the guides 67 thus maintaining pressure between the drum and the end plate. Axial movement of the straw bale within the drum 12 is also encouraged by its inclination to the horizontal, as illustrated in FIG. 1, and by the presence with the cylindrical wall 15 of a plurality of axially extending inclined ribs 67 which project radially inwardly and lie on a long pitch helix so as to encourage axial movement of the drum towards the end wall 17 when the drum is rotated in the direction of the arrow B.

Loading of the drum 15 can be effected easily by lowering the tractor three point linkage until the support frame 13 contacts the ground, and then releasing the engagement of the notch 28 in the pin 29 of the connector link 27. The support frame 13 carrying the drum 12 is now connected to the attachment frame 14 only by the pivot 68 at the lower end of the attachment frame 14 and, consequently, subsequent slight raising of the tractor lift arms to raise the pins 32 will cause the support frame 13 and drum 12 to rotate until the drum is horizontal, or even slightly beyond horizontal, in which orientation a straw bale can readily be tipped into the drum and worked partly into it by hand. Then, upon lowering of the lift arms to lower the pin 32 the frame 13 readopts the orientation illustrated in FIG. 1 allowing the link 27 to be reconnected over the pin 29, following which raising of the lift arms will cause the machine as a whole to be raised, maintaining the same orientation, and rotation of the drum 12 by driving the motor 42 will cause the bale to be driven towards the end wall 17 by the inclined interior guides 67. The cutter disc 45 and blades 47, 48 are driven to rotate from the power take off shaft 69, which is directly connected thereto, whilst the drum 12 is rotated in the opposite direction by the motor 42. At the same time the tractor can be driven forward so that straw shredded between the teeth 49, 50 and delivered out through the discharge chute 52 to either side of the machine can be spread on the ground of an animal house rapidly and in a smooth and even layer.

Figure 6:
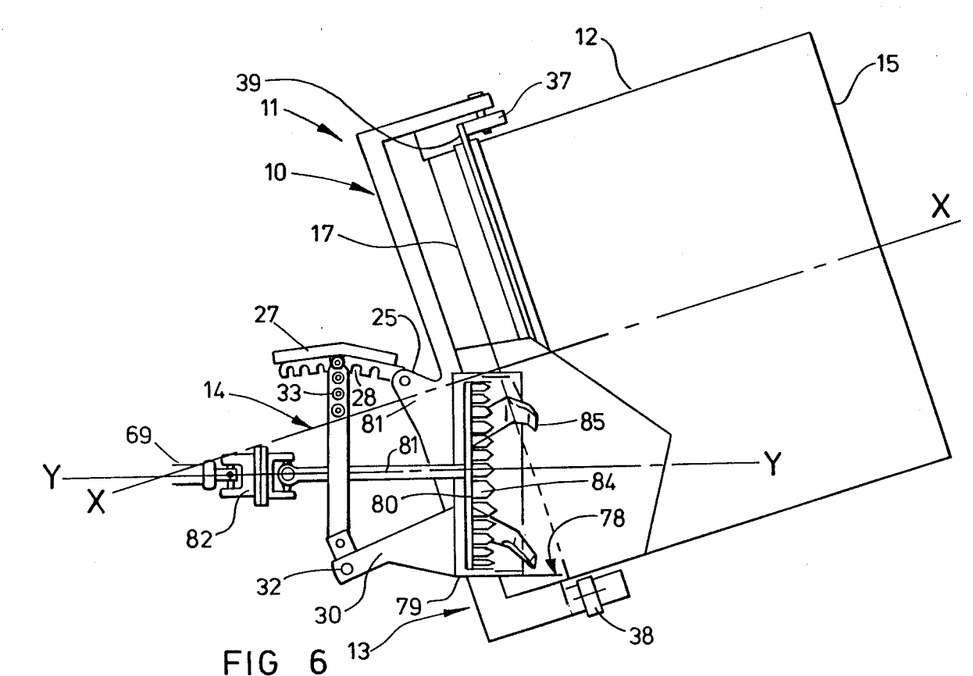
FIG. 6 is a schematic side view of a further embodiment of the invention.

An alternative embodiment is illustrated in FIG. 6. The embodiment illustrated in FIG. 6 includes many parts which are the same as or fulfil the same function as corresponding components in the embodiment of FIGS. 1 and 2 and these components have been identified with the same reference numerals. For simplicity many of these components have been shown only schematically.

Figure 2:
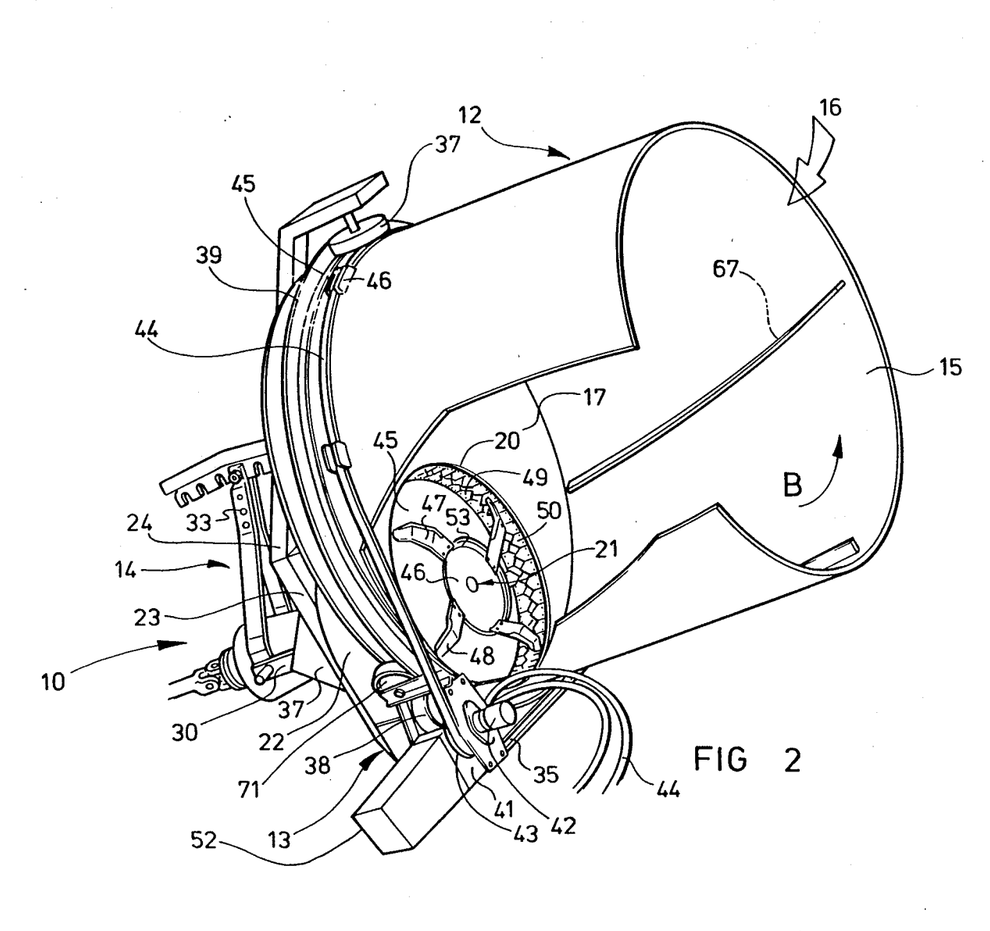
FIG. 2 is a cut away perspective view of the bale shredding machine illustrated in FIG. 1, showing the interior configuration thereof.

The embodiment differs from that of FIGS. 1 and 2 in the orientation of the cutter rotor 80 the axis Y—Y of rotation of which is inclined by an angle, shown in an exaggerated manner in the drawings, with respect to the axis X—X of rotation of the drum 12. The rotor 80 is carried on a driven shaft 81 connected by a universal joint 82 to a drive shaft 69 driven from a tractor vehicle via a power take-off shaft not shown.

The rotor 80 is provided with a ring of shredder blades 84 and axially and radially projecting cutter blades 85 the form of which may be as more particularly described with reference to FIG. 1 and 2. The rotor 80 is housed in a cylindrical casing 79 having an opening (not shown) through which the shredded material can be discharged in use of the machine. The casing 79 carries bearings (not shown) for the driven shaft 81 and is inclined so that the rotor 80 lies at an angle to the plane defined by the end wall 17. It is thus possible to arrange that the driven shaft 81 is approximately in alignment with the drive shaft 69 and with the tractor vehicle power take-off shaft so that the universal joint 82 is operated approximately in its straight ahead position when the rotary drum 12 is held by the three point linkage in the inclination illustrated in FIG. 6. For loading the drum 12 it is lowered as described above by lowering of the three point linkage to a position where the axis X—X of the drum is generally horizontal, in which configuration the universal joint 82 is inclined at a substantial angle; however in this orientation the machine is not driven to rotate, but merely positioned for loading a round bale or a plurality of smaller rectangular bales into the drum 60.

What is claimed is:

1. Bale shredding apparatus comprising:
   a rotatable drum for receiving a bale to be shredded;
   cutter means having a plurality of blades mounted so that said blades project into the interior of said drum whereby to engage a bale therein;
   means for discharging from said drum material removed from said bale by said cutter means, and
   drum mounting means supporting said drum for rotation about an axis of rotation lying inclined at an angle to the horizontal less than 90°, said drum mounting means comprising first and second frame parts pivotally interconnected and joined by link means, said link means being adjustable whereby to vary the relative inclination of said first and second frame parts.

2. Bale shredding apparatus comprising:
   a rotatable drum for receiving a bale to be shredded;
   cutter means having a plurality of blades mounted so that said blades project into the interior of said drum whereby to engage a bale therein;
   means for discharging from said drum material removed from said bale by said cutter means, and
   drum mounting means supporting said drum for rotation about an axis of rotation lying inclined at an angle to the horizontal less than 90°, said drum mounting means being adjustable whereby the inclination of said axis of said rotatable drum can be varied from a horizontal orientation to a maximum inclination less than 90° whereby to vary the feed rate of embaled material to said cutter means.

3. The bale shredding apparatus of claim 2, wherein said drum mounting means on which said rotatable drum is mounted comprises:
   a frame adapted for carrying said drum at one end thereof; said drum having an open loading end opposite said one end.

4. The bale shredding apparatus of claim 3, wherein said drum mounting means carries a plurality of rollers locating said drum rotatably with respect to said frame of said drum mounting means, said rollers comprising:
   a first set of rollers turnable about axes extending radially of said drum and engageable with a circumferential flange of said drum, and;
   a second set of rollers having axes extending parallel to said axis of rotation of said drum.

5. The bale shredding apparatus of claim 2, wherein said drum is driven to rotate by belt or chain transmission means passing around said drum.

6. The bale shredding apparatus of claim 2, wherein there are provided helically extending radially projecting inwardly directed guide vanes within the interior of said drum, said vanes acting, when said drum is rotated, to urge a bale therein axially towards said cutter means.

7. The bale shredding apparatus of claim 2, wherein said cutter means and said drum are driven to rotate about substantially parallel axes.

8. The bale shredding apparatus of claim 2, wherein the axis of rotation of said rotary cutter means projecting into the interior of said drum is inclined to said axis of rotation of said drum at an acute angle and laterally off-set from the axis of rotation of said drum.

9. The bale shredding apparatus of claim 2, wherein said cutter means and said drum are driven to rotate in opposite directional senses.

10. The bale shredding apparatus of claim 2, wherein the axis of rotation of said rotary cutter means projecting into the interior of said drum is inclined to said axis of rotation of said drum at an acute angle of not more than 10°.

11. The bale shredding apparatus of claim 2, wherein there is provided:
    at least one discharge chute from said apparatus, and
    protective guard means for said discharge chute comprising at least one inclined, substantially inflexible elongate barrier element attached at one end to one side of said discharge chute and having a free end spaced from a side of said chute opposite that to which said at least one barrier element is attached, and in the vicinity of an exit from said discharge chute.

12. The bale shredding apparatus of claim 2, wherein said cutter means is rotatable about an axis substantially parallel to said drum axis, and laterally off-set therefrom, said cutter means including a plurality of cranked, generally radially outwardly extending blades projecting axially from a rotor of said cutter means through an opening in a non-rotatable end wall of said drum.

13. The bale shredding apparatus of claim 2, wherein said cutter means is rotatable about an axis lying at an inclination of less than 10° from said drum axis, and laterally off-set therefrom, said cutter means including a plurality of cranked, generally radially outwardly extending blades projection axially from a rotor of said cutter means through an opening in a non-rotatable end wall of said drum.

* * * * *